United States Patent

Wheeler

[11] 4,268,144
[45] May 19, 1981

[54] IMAGE BEARING TEMPLATE FOR INSTANT CAMERA FILM PACKS

[75] Inventor: Alton D. Wheeler, Pasadena, Tex.

[73] Assignee: KW Research and Development, San Marino, Calif.

[21] Appl. No.: 119,416

[22] Filed: Feb. 7, 1980

[51] Int. Cl.³ .............................................. G03B 17/24
[52] U.S. Cl. .................................................. 354/108
[58] Field of Search ............... 354/276, 108; 355/74, 355/54, 39; 40/1.6, 5, 611, 17, 18

[56] References Cited

U.S. PATENT DOCUMENTS

| 1,327,138 | 1/1920 | Brown | 354/107 |
|---|---|---|---|
| 1,396,035 | 11/1921 | Gaisman | 354/108 |
| 1,504,959 | 8/1924 | Leschbrandt | 354/108 |
| 1,564,595 | 12/1925 | Lohrer | 40/5 |
| 1,588,864 | 6/1926 | Weiss | 40/5 UX |
| 3,618,495 | 11/1971 | Kuhns | 354/118 |
| 3,916,423 | 10/1975 | Ueda et al. | 354/108 |

FOREIGN PATENT DOCUMENTS 229375 1/1959 Australia .................................. 40/18

*Primary Examiner*—Donald A. Griffin
*Attorney, Agent, or Firm*—William W. Haefliger

[57] ABSTRACT

A device to label photographic films carried by structure including a frame, comprises
(a) a template in the form of a transparent, generally planar and rectangular sheet adapted to carry an image to be reproduced on the film,
(b) the template having retainer tabs projecting at multiple edge portions of the sheet to removably fit beneath said frame to retain the template to said structure so that the main extent of the template overlies film carried by said structure,
(c) the template having a limit tab projecting at one edge portion of the sheet and outside the plane of said sheet to engage an edge of said frame for preventing removal of the template in response to endwise removal of exposed film from the carrier structure, whereby the sheet remains in the path of light transmission to unexposed film carried by said structure.

15 Claims, 8 Drawing Figures

U.S. Patent     May 19, 1981     4,268,144
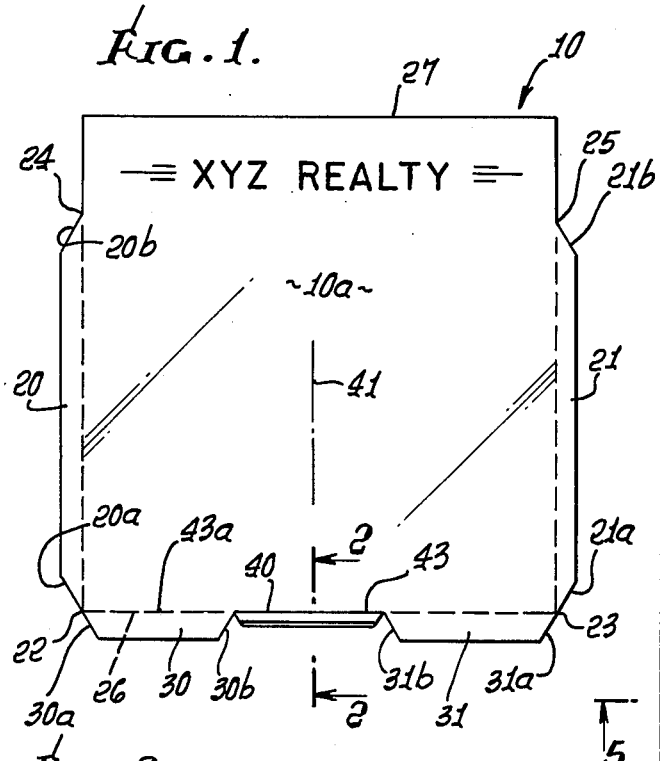
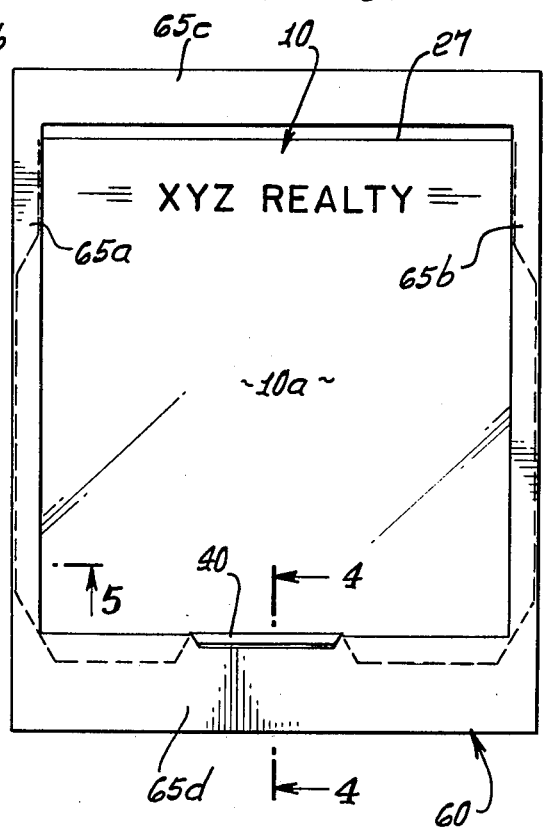
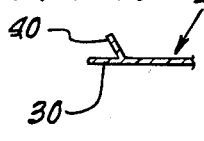
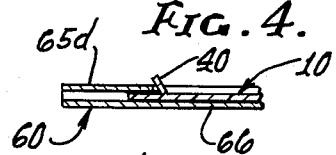
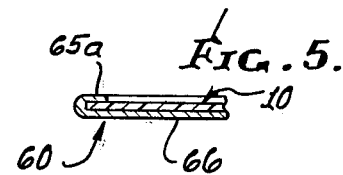
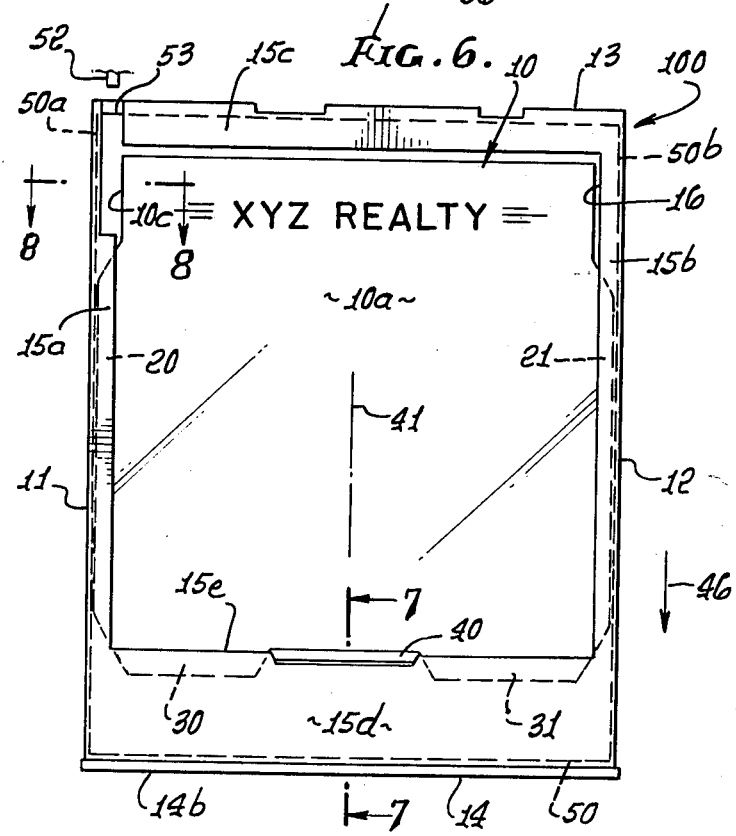
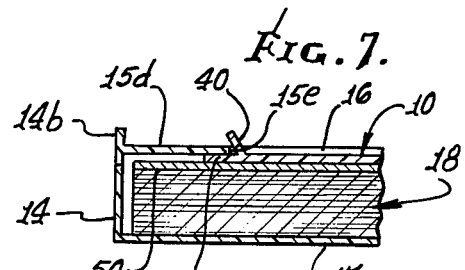
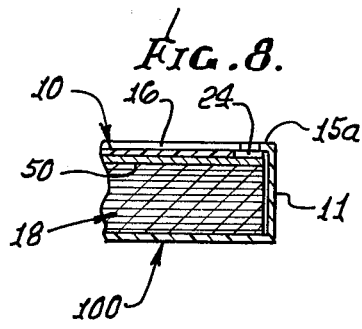

IMAGE BEARING TEMPLATE FOR INSTANT CAMERA FILM PACKS

BACKGROUND OF THE INVENTION

This invention relates generally to photography, and more particularly concerns the reproducing of selected images within a camera on film being exposed to light coming from sources outside a camera.

There is a perceived need for means to permit a photograph to "label" films with selected images in addition to those resulting from entrance of external light into a camera. Thus, for example, it would be of great commercial advantage to form an image or service mark of a business onto films exposed to light coming from an object or building associated with that business, all at the time of exposure of the film. Many other examples of such need for film labeling exist. However, no prior device embodying the unusual advantages of the herein described device, meeting such needs, has existed, to applicant's knowledge.

SUMMARY OF THE INVENTION

It is a major object of the invention to provide a device of the character referred to, and which is usable in conjunction with exposure of a film carried by structure including a frame bounding a light passing zone. Basically, the device comprises, (a) a template in the form of a transparent, generally planar and rectangular sheet adapted to carry an image to be reproduced on the film, (b) the template having retainer tabs projecting at multiple edge portions of the sheet to removably fit beneath said frame to retain the template to said structure so that the main extent of the template overlies film carried by the structure, (c) the template having a limit tab projecting at one edge portion of the sheet and outside the plane of the sheet to engage an edge of said frame for preventing removal of the template in response to endwise removal of exposed films from the carrier structure, whereby the sheet remains in the path of light transmission to unexposed film carried by said structure.

As will appear, the template typically has two longitudinally extending side tabs and two end tabs, all shaped to removably fit easily under frame cover portions bounding a light passing zone; and the limit tab is located between the end tabs to centrally receive loading blocking template remove from the pack during slide out film removal; and a template holder may be employed to demonstrate to the user how to insert the template into the pack.

These and other objects and advantages of the invention, as well as the details of an illustrative embodiment, will be more fully understood from the following description and drawings, in which:

DRAWING DESCRIPTION

FIG. 1 is a plan view of a transparent template embodying the invention;

FIG. 2 is a section on lines 2—2 of FIG. 1;

FIG. 3 is a plan view of the FIG. 1 template on a carrier that simulates a film pack frame;

FIG. 4 is a section taken on lines 4—4 of FIG. 3;

FIG. 5 is a section taken on lines 5—5 of FIG. 3;

FIG. 6 is a plan view of a frame for a film pack, with the FIG. 1 template carried by the frame;

FIG. 7 is an enlarged section on lines 7—7 of FIG. 6; and

FIG. 8 is an enlarged section on lines 8—8 of FIG. 6.

DETAILED DESCRIPTION

Referring first to FIG. 1, device 10 comprises a template adapted for use in conjunction with exposure of photographic film carried by structure that includes a frame. One such frame appears at 100 in FIGS. 6–8, and includes side walls 11 and 12, front and rear walls 13 and 14, a top cover having portions 15a–15d bordering an opening 16, and a bottom cover 17. That frame may consist of lightweight plastic material, as for example is exemplified by the POLAROID SX-70 LAND FILM frame for a film pack, as is seen at 18 in FIGS. 7 and 8. The top portion 14b of wall 14 is removable to allow pull-out removal of film, in use.

Referring back to FIG. 1, the template is in the form of a transparent, generally planar and rectangular plastic sheet adapted to cause an image to be reproduced on successive film sheets 18. Merely as illustrative, the template is shown to carry the image "XYZ REALTY", as in the form of heavy dark lines and that image is successively reproduced on each sheet of film 18 as that sheet is exposed to light passing through the template and onto the film, as the camera (into which the film pack is inserted) is operated.

The template, which may consist of polyethylene about 0.005 inches thick, for example, has retainer tabs projecting at multiple edge portions of the sheet to removably fit beneath two or more of the frame border portions 15a–15d, thereby to removably retain the template to the frame structure so that the main central extent 10a of the template overlies the stack of film sheets 18 in the pack carried by the frame. More specifically, the multiple tabs include two longitudinally elongated, like, relatively narrow, parallel tabs 20 and 21 projecting oppositely at opposite sides of the template. Those tabs extend from locations 22 and 23 adjacent one end 26 of the template toward the opposite end 27 of the latter, but terminate at locations 24 and 25 in spaced relation to that opposite end of the template. Tabs 20 and 21 have tapered end terminals 20a and 20b, and 21a and 21b, whereby the tabs have trapezoidal shape. The tab widths are desirably each about 0.14 inch.

Further, the multiple tabs also include two laterally elongated tabs 30 and 31 at said one end 26 of the template, the tabs 30 and 31 being in lateral alignment, spaced apart and in the plane of the template. They have tapered terminals 30a, 30b, 31a and 31b, and terminals 30a and 20a are typically in alignment as are terminals 31a and 21a. Thus, tabs 30 and 31 are also trapezoidal in outline. The number of exposed, sharply pointed corners is thereby reduced, aiding insertion of the tabs beneath frame structure as seen in FIG. 6. The width of each tab 30 and 31 is approximately 0.20 inch.

The limit tab 40 is generally located between tabs 30 and 31, to extend in alignment with the longitudinally extending central axis 41 of the template, thereby to centrally receive force resulting from engagement with edge 15b of frame cover portion 15a (see FIG. 7). Note that the width of the limit tab is considerably less than the widths of tabs 30 and 31, so as not to project materially above the top plane of the pack frame 100 (i.e. so as not to interfere with insertion of the frame into the camera). Thus, the width of tab 40 is typically about 0.075 inch. It joins the template along a lateral hinge line 43 which is in generally endwise alignment with the lines 43a of juncture of the tabs 30 and 31 with the template. In this regard, all tabs and the template may consist or be formed of the same transparent plastic material.

In FIG. 6, the tabs 20 and 21 removably fit beneath frame cover portions 15a and 15b, and extend to frame walls 11 and 12 to centrally position the template in the frame, i.e. against appreciable lateral movement. Also, tabs 30 and 31 removably fit beneath frame cover portion 15d, whereas limit tab 40 projects upwardly to flatly engage edge 15e as referred to, blocking movement of the template in the direction of arrow 46 (the direction of film withdrawal from the pack or frame). Thus, the template remains in the frame, while successive film sheets are withdrawn, so that each time a film sheet is exposed, the image on the template is reproduced on the film exposed. The template may be removed from the pack or frame for later use with another frame.

A protective cardboard sheet 50 is shown overlying the top of the film pack, and underlying the template. The longitudinal edges 50a and 50b of the sheet 50 also underlie frame cover portions 15a and 15b. As the pack is inserted into a camera, a pusher 52 in the camera pushes against edge 53 of the cardboard to push it out of the pack in the direction of arrow 46. Since template 10 is relieved at 10c, it is not engaged by the pusher 52. Note that template tab 20 is not exposed at the cut-away section 15aa of the cover portion 15a, but remains beneath portion 15a.

FIGS. 3–5, show a cardboard holder 60 which interfits the template and tabs in the same manner as frame 100, for instructional purposes. Thus, the template purchaser sees how the template interfits its holder 60 at the time of purchase, and he can then easily remove it from the holder and attach it to a film pack. Elements 65a–65d correspond to elements 15a–15d. The bottom of the holder appears at 66.

I claim:

1. A device for use in conjunction with exposure of a photographic film carried by structure including a frame bounding a light passing zone, and comprising
   (a) a template in the form of a substantially transparent, generally planar and rectangular sheet adapted to carry an image to be reproduced on the film,
   (b) the template having multiple retainer tabs projecting at multiple edge portions of the sheet to removably fit beneath said frame to retain the template to said structure so that the main extent of the template overlies film carried by said structure,
   (c) the template having a limit tab projecting at one edge portion of the sheet and outside the plane of said sheet to engage an edge of said frame for preventing removal of the template in response to endwise removal of exposed film from the carrier structure, whereby the sheet remains in the path of light transmission to unexposed film carried by said structure,
   (d) said multiple tabs include two laterally elongated tabs at said one end of the template, said two laterally elongated tabs being in lateral alignment, and spaced apart, said limit tab located generally between said two laterally elongated tabs.

2. The device of claim 1 wherein said multiple tabs include two longitudinally elongated, relatively narrow, parallel tabs at opposite sides of the template and extending from one end of the template toward the opposite end thereof, but terminating in spaced relation to said opposite end.

3. The device of claim 2 wherein said two longitudinally elongated tabs have tapered end terminals.

4. The device of claim 2 wherein each of said longitudinally elongated tabs has a width which is approximately 0.14 inch.

5. The device of claim 1 wherein said two laterally elongated tabs have tapered end terminals.

6. The device of claim 1 wherein said limit tab joins said template along a lateral hinge line which is in generally endwise alignment with the lines of juncture of said laterally elongated tabs with said template.

7. The device of claim 6 wherein all of said tabs have trapezoidal outline.

8. The device of claim 7 wherein all of said tabs consist of the same plastic material as said template.

9. The device of claim 1 wherein each of said spaced apart laterally elongated tabs has a width which is approximately 0.20 inch.

10. The device of claim 9 wherein said limit tab has a width which is about 0.075 inch.

11. The device of claim 1 wherein said limit tab has a width which is substantially less than the widths of each of said laterally elongated tabs.

12. The device of claim 1 including said film pack frame carrying said template, the frame having cover portions bordering a central opening, said longitudinally elongated tabs removably fitting beneath two of said frame cover portions which extend longitudinally, said laterally elongated tabs removably fitting beneath one of said frame cover portions which extends laterally, said one cover portion having a lateral edge adjacent said central opening, said limit tab flatly engaging said edge to block relative sliding of said template in a direction toward and beneath said lateral edge.

13. The device of claim 12 including a protective cardboard sheet directly beneath said template, and the pack including film beneath said cardboard sheet, said cardboard sheet having longitudinal edges underlying said frame cover portions which extend longitudinally, at least one of said longitudinal tabs projecting laterally beyond the cardboard sheet edge to closely interfit the pack frame.

14. The device of claim 1 including a holder carrying said template, the holder having cover portions bordering a central opening, said longitudinally elongated tabs removably fitting beneath two of said holder cover portions which extend longitudinally, said laterally elongated tabs removably fitting beneath one of said holder cover portions which extends laterally, said one cover portion having a lateral edge adjacent said central opening, said limit tab flatly engaging said edge to block relative sliding of said template in a direction toward and beneath said lateral edge.

15. A device for use in conjunction with exposure of a photographic film carried by structure including a frame bounding a light passing zone, and comprising
   (a) a template in the form of a substantially transparent, generally planar and rectangular sheet adapted to carry an image to be reproduced on the film,
   (b) the template having multiple retainer tabs projecting at multiple edge portions of the sheet to removably fit beneath said frame to retain the template to said structure so that the main extent of the template overlies film carried by said structure,
   (c) the template having a limit tab projecting at one edge portion of the sheet and outside the plane of said sheet to engage an edge of said frame for preventing removal of the template in response to endwise removal of exposed film from the carrier structure, whereby the sheet remains in the path of light transmission to unexposed film carried by said structure, (d) said multiple tabs including laterally elongated tab structure at one end of the template, said limit tab located generally laterally of said laterally elongated tab structure, said laterally elongated tab structure projecting beyond said one end further than said limit tab.

* * * * *